Sept. 10, 1968    G. F. H. VON STROH    3,400,465
PERMEABLE BED DRYING PROCESS
Filed Jan. 26, 1967    3 Sheets-Sheet 1
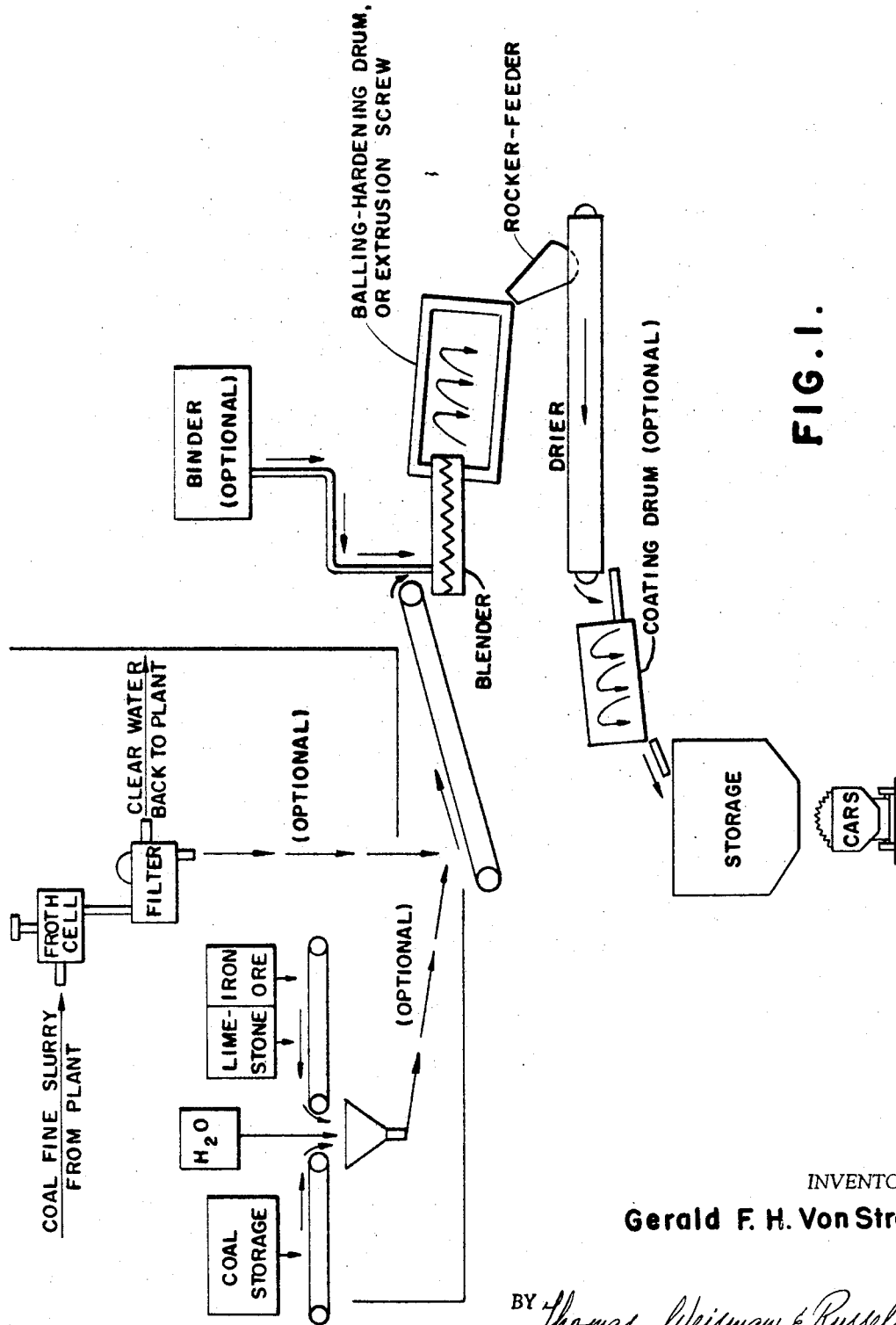
FIG. I.
INVENTOR
Gerald F. H. Von Stroh
BY *Thomas, Weisman & Russell*
ATTORNEYS

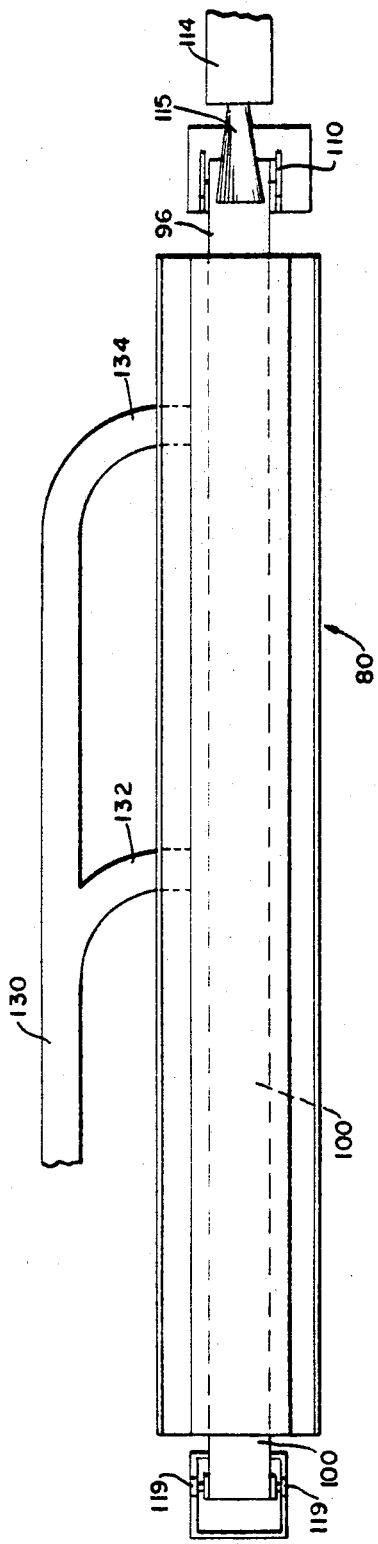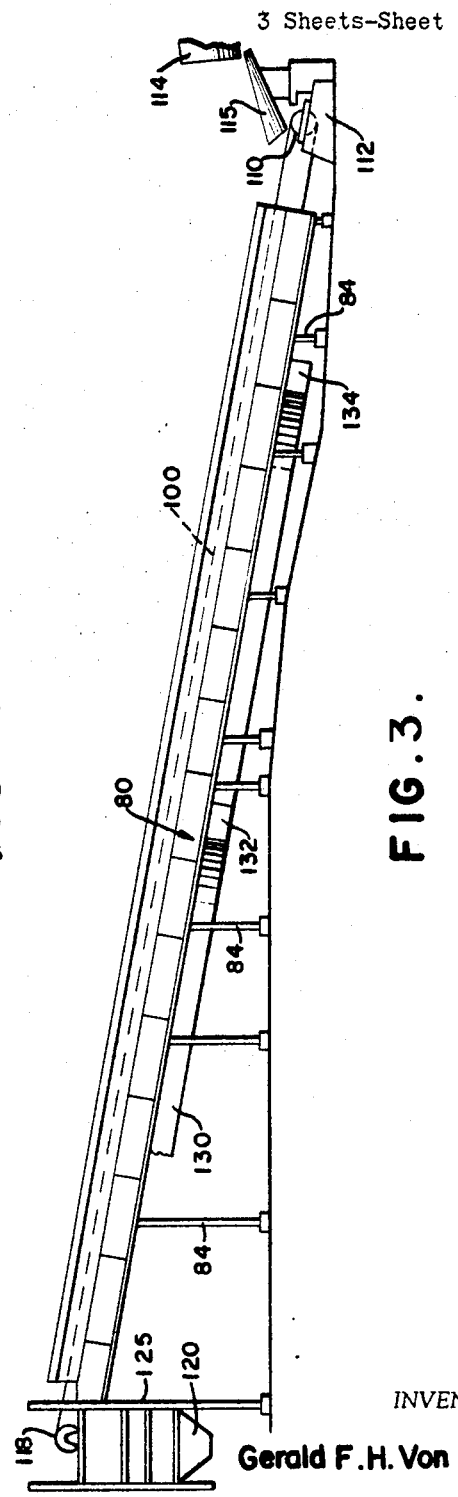

Sept. 10, 1968  G. F. H. VON STROH  3,400,465
PERMEABLE BED DRYING PROCESS
Filed Jan. 26, 1967  3 Sheets-Sheet 3

INVENTOR
Gerald F. H. Von Stroh

BY *Thomas, Weisman & Russell*
ATTORNEYS

United States Patent Office 3,400,465
Patented Sept. 10, 1968

3,400,465
PERMEABLE BED DRYING PROCESS
Gerald F. H. von Stroh, Huntington, W. Va., assignor of fifty percent to James D. Ireland, Cleveland, Ohio
Continuation-in-part of application Ser. No. 223,135, Sept. 12, 1962. This application Jan. 26, 1967, Ser. No. 611,966
4 Claims. (Cl. 34—22)

ABSTRACT OF THE DISCLOSURE

A process for the drying of a bed of pelleted fines wherein the bed has a permeability to a drying medium of no less than about 20%, the bed being superimposed upon a support area having a substantially lesser permeability than that of the bed, thus to assure uniform drying of the pellets without regard to non-uniform thickness of the bed and without substantial disturbance to the bed.

---

This invention relates to a process for the agglomeration and pelleting of various types of extremely fine materials, singly or in combination with coarser particles, which often, in their available state, are unusable by reason of the very minuteness of the respective sizes thereof; the invention also is directed to a novel blending apparatus for use in processes of this nature, such apparatus attaining in the course of operation thereof a high and efficient degree of blending or intermixing in such fashion that subsequent balling, extruding, and pelleting may be achieved with minimum difficulty. The involved procedure also contemplates a novel process directed to the drying of these agglomerates, balls, extrusions, or pellets so that the ultimate form thereof is relatively permanent, of even and uniform size, and dried to the extent that where, e.g., carbonaceous and iron ore starting materials are used, subsequent casting, molding or blast furnace operations are more efficiently achieved.

This application is a continuation-in-part of my application Ser. No. 223,135, filed Sept. 12, 1962, now Patent No. 3,377,146.

The pelleting of various types of materials is commercially known today. However, the difficulty inherent in many known processes lies in achieving pellets or granules of uniform and suitable size and of that mechanical strength which will permit their usage in subsequent industrial procedures, such as blast furnace operations, iron ore reduction processes, metal casting operations, et cetera. Also, and particularly where carbonaceous pellets are desired for use in the referred to ion ore reduction process, it has been difficult, if possible at all, in the practice of known procedures, to obtain a pellet having a coal or carbonaceous content of low ash and low moisture, the low ash content within the specific limitations herein set forth being a considerable attribute when such a product is employed in casting procedures.

Difficulty has also been encountered in the handling of fines or small particle sizes, of whatever nature the starting material be, due to the difficulty of intermixing or blending such particles in homogeneous fashion together with other desirable additives, such as coarse particles and suitable binders which render the ultimate product, the individual pellet, relatively indestructible, hard surfaced, and otherwise suitable for use in the various commercial practices heretofore generally referred to. This attribute of inherent hardness or durability, difficult to heretofore achieve, has considerable importance from the viewpoint of exploitation of the product here under consideration—pellets formed from extremey small fines. The latter statement is particularly applicable to a pellet product which is designed for use in, for example, a blast furnace. Here the pellet must be practically indestructible at temperatures of up to some 2400° F. If it deteriorates at lower temperatures, its effectiveness and desirability as a means of reducing iron ores is substantially impaired.

The processes and novel means for practicing the same of the present invention thus have as a primary objective the attaining of a pellet product from extremely small fines of material which are often discarded as unusable, such processes contemplating, inter alia, the several steps of blending the fines together with a suitable binder in such manner as to render the mixture a completely homogeneous one and further, in such manner as to create small granular seed pellets or nuclei, balling or extruding such nuclei to the desired size, and then efficiently drying the resultant pellet or extrusion by a unique drying means and method, whereby the ultimate product is a resultant hard, uniform, dry pellet, or extrusion, usable for many commercial operations.

Another objective of the invention is the provision of a process to obtain a completely dry pellet of uniform density, having a hard surface, and with little or no tendency to "dust" so that the product is adaptable for many different types of commercial procedures, such as those indicated in the foregoing.

A further object of the invention is the provision of a pellet product characterized by an extremely low ash content and which represents, insofar as at least one procedure involving metal casting be concerned, a non-fluxing surface to the casting material, thus attaining a cast having a more even and perfect surface. In this respect the invention contemplates the use of a carbonaceous material known as seacoal as the base component, it being recognized that this type of finely ground coal has been generally used to keep the sand of the sand mold from adhering to the casting by generation of a gas film when in contact with the poured hot metal. The product of the instant invention, however, and as indicated, attains a pelleted seacoal of the desired size for this purpose which, because of its low ash content, is non-fluxing and hence enables attainment of a greatly improved metal surface.

An additional object of the invention is the provision of a process for the production of agglomerates or pellets of the described nature which contemplates the efficient use of various types of binding reagents during the course thereof, such being so uniformly and effectively dispersed throughout the mass thereof that the resultant pelleted product exhibits the required hardness, internal and surface homogeneity referred to in the foregoing. In this respect very low cost binding reagents may be used, such as certain waste liquors represented by lignin sulfonate, or on the other hand, relatively inexpensive binding reagents as cereal, grain, or certain sugar type binders.

Another objective of the invention is the provision of a process by which the solid materials which originate from furnaces such as the open hearth furnace, may be cooled, agglomerated and pelleted so that they also can be utilized as open hearth charge and feed ore, basic oxygen furnaces (B.O.F. units), electric furnace charge material, as well as blast furnace pellets. Here again the process contemplates the use of a high speed, intensive mixer or blender of novel design which, by reason of the complete intermixing of the base components of the materials, and the resultant homogeneity thereof, produces a material that can be readily balled, pelleted, and dried for ultimate use in various industrial processes.

A further object of the invention is the provision of a unique intermixing or blending mechanism for preparation of the starting, base materials, such apparatus involving the use of twin high speed, rotating shafts fitted with paddles of critical design set at a predetermined angle of pitch, and which are slightly overlapping or intermeshed, so that when such shafts are rotated in opposite directions, an extremely high degree of agitation is attained together with a shredding action in such fashion that a maximum degree of dispersion-blending-mixing, consistent with the requirements of the given process, is efficiently attained. The blending step of the instant process is primarily dependent upon the use of the apparatus herein disclosed, the latter attaining that degree of homogeneity and complete intermixture which is necessary to provide primary nucleation, and subsequently, adequate balling or pelleting of the material in a size and form suitable for use in the various commercial practices generally referred to above.

A more complete description of the invention is made in the following with reference to the drawings appended hereto, wherein:

FIGURE 1 is a flow sheet graphically disclosing two optional pelleting processes—one utilizing a plant slurry as the starting material to be ultimately pelleted, and the other employing an iron ore mixture of ore, limestone and coal fines as the base components;

FIGURE 2 is a top plan view of the drying oven of the invention as such is employed in the processes herein referred to;

FIGURE 3 is a side elevation view of the drier as it is shown in FIGURE 2;

Figure 4:
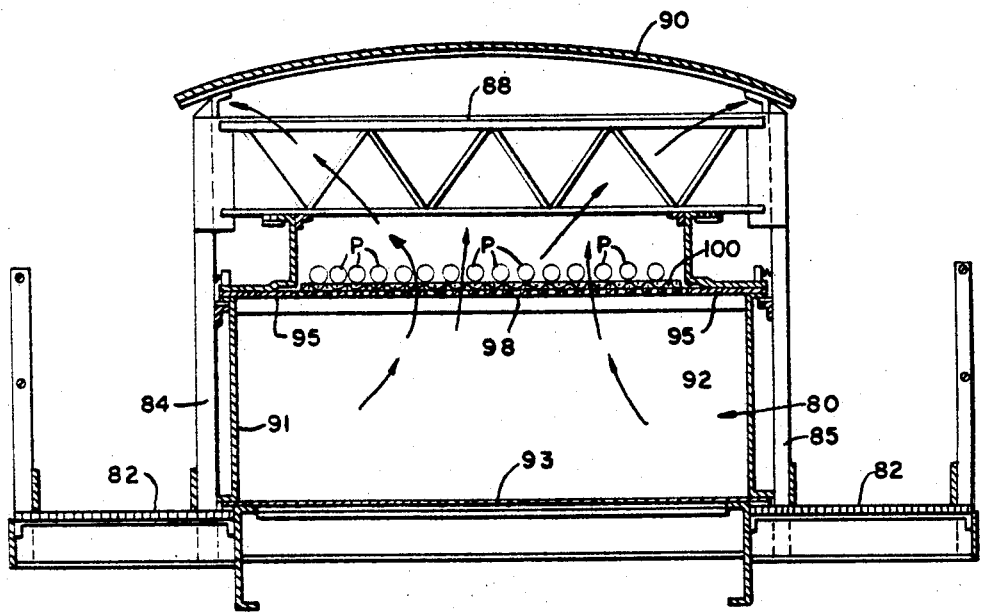
Figure 5:
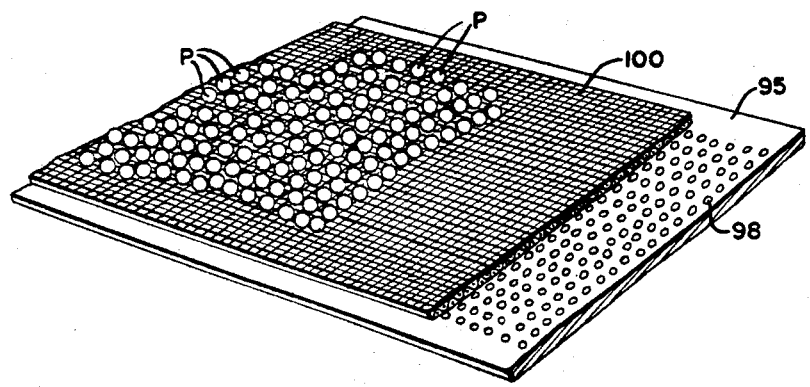

FIGURE 4 is a section view of the drier apparatus indicating the manner by which a consistent stream of drying medium is passed through the balled or pelleted material; and FIGURE 5 is a detailed perspective view of the woven wire belt for conveyance of the pelleted product through the drying oven, indicating the perforated bed over which such wire belt is propelled, such apertures or perforations being of that number calculated to achieve complete drying without disturbance of the charge placed thereon, e.g., a layer or layers of the pelleted product.

Referring to FIGURE 1, there is here shown two optional processes, in flow sheet form, falling within the scope of the present invention and representative thereof.

In the first of these a coal fine slurry is treated in such manner that the coal is extracted therefrom and ultimately pelleted. Such plant slurries, heretofore regarded simply as waste products, thus by the practice of the instant invention are converted into useful products for use in many plant processes. The solids content of such a slurry may be in the neighborhood of 5%.

In the instance depicted in FIGURE 1, such slurry is passed to a froth cell or froth flotation unit (or series of such cells), the action of which tends to thicken the slurry by the flow of air through the cell. A reagent, preferably methyl isobutyl carbinol, is fed into the feed slurry to implement frothing and consequent thickening. The frothing action is such that the froth (bubbles) generated by mechanical-air action on the slurry plus reagent will selectively attach to one of the mineral constituents but not the other and therefore in the case of coal the froth will attach to the coal but not to the ash. Therefore, the froth which is removed from the top of the vessel or cell will contain essentially coal and the non-frothed solids which are removed with the stream of water will be ash.

From the froth flotation unit, such solid-liquid mixture is fed to a suitable filter where further moisture is removed. Such commercial type filters may reduce the moisture from 70% to 25% in coal slurries. The cake from the filter, representing a resultant thickened or pasty liquid-coal mix of about 25% moisture is then conveyed by a suitable conveyor to the blender, the latter being disclosed in more particular hereinafter. If desired, a suitable binder is incorporated in the mixture at the input to the blender, this binder comprising, in one version of the invention, lignin, or lignin sulfonate liquor, a by-product from the acid leeching process for making paper. In the blender, the solid-liquid mixture is agitated at a high rate of speed, with a shear effect, and with such violence that the entire mass becomes homogeneous and of like percentage composition throughout. The blades of the blender continuously force the charge through from input to discharge end thereof. The blender may also be inclined in either direction as a further control factor over speed of output. The blender also stimulates the formation of small granules, nuclei, or seed pellets, which are formed near the discharge end thereof. The latter are then passed into a balling-hardening drum such as diagrammatically indicated in FIGURE 1—or an extrusion screw. Apparatus of this nature is known to the art and may take the form of that rather generally disclosed in the patent to De Vaney No. 2,543,898.

Seed pellets which have emanated from the blender are caused to agglomerate or become larger in the balling drum. Control over speed and inclination of the latter, together with the nature of the involved mixture, dictates the over-all size of the pellets so formed within the balling drum. The speed of the drum will vary with the diameter of the drum, the mean average particle size, desired diameter of pellets and the specific gravity of the materials being pelleted. In a coal pelleting operation a ten foot diameter drum may be varied in speed from 18 to 36 r.p.m., with a preferred speed of about 24 r.p.m.

It has also been determined that on many materials, as the seed pellets are agglomerated and become larger the mechanical action causes the pellets to become compact with zero voids. At the same time the moisture will be squeezed out so that the surface of the pellets becomes quite wet. By providing a means of heating the balling drum, particularly on the discharge half to about 150° F. the surface moisture on the pellets will be evaporated and a better pellet will result. The amount of moisture removed at this phase will be from 1 to 5% depending on the material and starting moisture; for example, in a coal pellet with a starting moisture from the blender of 30%, the moisture at discharge from the balling drum will be 25%.

From the balling drum these pellets are discharged to a rocker-feeder mechanism of the type shown and described in the pending application for patent, Ser. No. 207,552, filed July 5, 1962, in the name of E. E. Trautwein, now Patent No. 3,209,893. This rocker-feeder mechanism has the unique propensity of receiving a relatively narrow flow of material from the balling-hardening drum and, by measuring oscillatory movement of the trough to which these pellets are fed, uniformly spreading these pellets onto a surface of substantially greater width.

At this point in the process the pellets or extrusions are relatively soft and weak. In addition relative motion during the drying phase would cause considerable degradation of the pellets and loss of materials as dust. It is therefore important that there be as little relative motion between pellets or extrusions during the drying phase as is possible. Therefore, by placing said pellets or extrusions on a porous conveying medium the pellets and extrusions will not be damaged or material lost providing the velocity of the drying medium is low enough to prevent floating or causing relative motion between the pellets and extrusions.

There are a number of commercial driers using a porous conveying medium but which have the disadvantage of non-uniform drying because of varying load or volume of material being dried or conditioned and/or high drying medium velocities which will cause degradation of the materials being dried or conditioned.

The temperature of the drying medium is frequently determined by some critical temperature of the material being processed. For example, in the case of di-ammonium phosphate granules which are produced by feeding 5% moisture fines to the blender described, the product seed pellets, of 10 x 30 mesh size, are distributed directly from the blender to the drying belt. In this case the temperature cannot exceed 150° F. because at temperatures above this the material will chemically break down.

The advantage of the invention is that it permits the use of relatively large volumes of dry air and permits drying by differential relative humidity rather than by merely heating the material. For example, a coal pellet or iron ore pellet can be reduced in free moisture from 25% to less than 1% without the center of the pellet becoming higher than room temperature by virtue of the fact that the dry air, when passing over a wet or wetter surface, will absorb moisture from the surface. The pellets, agglomerates or extrusion product will transfer moisture from the interior to the surface by capillary action and if dry air, regardless of temperature, is passed over the surface, the free moisture in the pellet will be reduced to less than 1%.

The only function of heating the air is to accelerate the rate of drying and in some instances, certain materials require that the dry air be obtained by refrigeration.

In any event, and as an example, the required surface may take the form of a moving woven wire conveyor belt which is passed through a drying oven of substantial length. The belt should be of about a five foot width. The drying medium, more usually dry air, is passed through this belt by being forced into a plenum chamber underneath the belt and thence through a perforate steel plate positioned below the belt, and upon which the belt and pellets ride. The number of perforations in the aforesaid plate are so proportioned, as will be explained hereinafter, as to never exceed the permeability of the mass riding upon the belt, i.e., the permeability of the bed of pellets, considering the depth or thickness thereof, thus assuring that the charge being dried is not blown about as to result in discharge from the belt, or rupturing thereof by collision, et cetera, as well as also assuring relatively uniform distribution of the drying medium regardless of variance in load or depth of pellets from one end of the belt to the other.

If desired, each of the pellets, after this drying procedure, can be coated with a suitable coating reagent in a coating drum, such coating procedure further assuring discreteness of the particles as well as surface hardness thereof. From such a coating step the particles or pellets are transferred to storage.

In the other optional process depicted graphically in FIGURE 1, the main differences lie only in the nature of the material being pelleted. Here a material such as coal fines is intermixed with limestone and iron ore in proportioned amounts, and water added to form a solid-liquid slurry of these several components. The purpose of this procedure is to produce a pellet suitable for blast furnace, open hearth, B.O.F. units or cupola firing, such containing the necessary carbonaceous and limestone ingredients that will cause reduction of the iron ore to iron, as will be appreciated by those skilled in the art.

The latter slurry, of about the same viscosity or solids-liquid ratio as mentioned with regard to the coal fine slurry but which will vary inversely with the mean specific gravity of the materials being agglomerated, is then routed through the same procedural steps as mentioned in the first instance. These will generally involve agitation in the blender at speeds of the latter which result in obtaining complete homogeneity of the mass with binder included, if that be desired, and which will achieve also the desideratum of formation of pellet nuclei or granules suitable for admission to the balling drum. When discharged to the latter and subjected to the tumbling treatment of the balling drum, these granules, as in the former case, agglomerate and form larger balls or pellets of approximately equal dimension. In the case of further agglomeration by an extrusion screw such a granulated material permits more effective compression and evacuation of entrained air by the extrusion screw. Passed to the rocker-feeder they are spread upon the woven wire belt, as in the first instance, and by means of the latter conveyed through a drying oven or chamber, with complete and uniform removal of substantially all of the moisture from each pellet product.

Coating, as indicated, may follow with ultimate discharge into storage.

Further specific examples of the invention will be referred to in the following. However, in order for the nature of the process to be more fully appreciated the apparatus which is utilized therein to achieve the results desired will first be described in more detail.

In this respect the specific assembly or combination found in the blender is of primary importance in achieving proper operation of the process of this invention, and as well, a commercially desirable pelleted product. Similarly, the novel mechanical arrangement with respect to the drying oven is significant in enabling effective practice of the process wherein pellets, formed of almost any type of base material or blended components, are subjected to a drying stage that assures evenness of drying throughout the entire mass of the product—a factor which in many instances is of prime importance, as the use of such preformed pellets in either blast furnace or mold casting operations.

As a prefatory matter, the blender mechanism is designed to handle, condition and mix wet, sticky, finely divided filter cake at rates of up to 50 tons per hour per unit, assuming the specific gravity of the charge to be about 1.5. At this point in the referred to process the charge to the blender is so wet and sticky that it will adhere and bridge between the vertical walls of the mechanism. It is to be noted as to volume requirements, tip speeds, and other variables adjustable to handle different types of material, such constitutes a function of the specific gravity correlated to the critical speed of the average particle size of the material being blended.

Basically, the blender mechanism represents a continuous double shaft paddle mixer operating at very high speeds. As stated, the tip speed (tip of the paddles) is a function of the specific gravity as correlated to the critical speed of the average particle size being blended.

The meaning of "critical speed," as that phase is used in this specification, is as follows: It is defined as that speed of rotation creating that amount of centrifugal force sufficient to cause the outward momentum of the particle to exceeed the linear force resulting in the outward movement of the particle from the rotating element.

Centrifugal force is a function of the mass of the particle. This in turn is a function of its specific gravity in relation to its particle size. The radius of rotation and the speed of rotation, and consequently, the critical speed for a given material rotating upon a six inch radius is substantially different from the critical speed of a particle rotating upon a 12 inch radius.

With regard to this invention, the particles are accelerated to their critical speed or in excess thereof, and therefore, would remain at the tip of the rotating paddles, to be held in place only by the restraining effect of other materials and/or the shell encasing the material and the rotating elements. When said materials are so suspended as to encounter a blade or paddle rotating in an opposite direction and/or a mass of the same material rotating in a different specific direction, a violent series of collisions between particles will take place imparting a mixing and blending action of a greater intensity than can be obtained by conventional mixing in such devices as a pug mill or muller, previously mentioned.

Materials having a very small, discrete particle size, such as extremely fine clay, will generally tend to remain affixed to the paddles since these particles do not have sufficient mass to be effected by centrifugal force. Particles of a discrete size, but relatively speaking, of somewhat larger mass, will tend to wipe the smaller particles from the paddles and under these conditions of violent shearing, ricocheting and shearing, will be more completely coated with a lower percentage of binder type materials or liquids than with conventional mixing equipment.

Critical speed, as same is herein defined, is subject to certain basic variables. They are as follows: (1) the particle size of the materials, (2) the specific gravity of the materials, and (3) the speed of rotation. For example, a 100-mesh particle of coal having a specific gravity of about 1.4 as compared to a 100-mesh particle of iron ore having a specific gravity of about 4.0: here the coal would require a rotating speed in terms of r.p.m. approximately three times greater than that for the iron ore (assuming the diameter of the rotating element to be constant in both cases). By the same token, a 200-mesh particle of coal would require six size times the speed in terms of r.p.m. as a 100-mesh particle of iron ore.

The preceeding somewhat applies the well-known principle of centrifugal force as published in various engineering and technical journals and instruction books. The formulas as shown on page 3–26 of Marks Mechanical Engineers Handbook are applicable in principle and can be used as a basis for computation of r.p.m. for a given mixture of materials; however, because of the size, shape and mass of the various materials and their aerodynamic factors (resulting from shape), modifications of the formulas as shown in the preceding reference are required.

Similarly, conventional formulas published for determining the efficient rotation speeds of ball mills for the grinding of various substances can be used as a guide. However, it should be born in mind that the proceedingly-mentioned formulas, i.e., such as those referring to this centrifical force component and critical speeds and primarily for such apparatus as ball mills, are usually predicated upon a more or less homogeneous material wherein, in the present instance, we were dealing with a mixture of materials which may individually vary in specific gravity from less than 1 to over 4. Therefore, the critical speed as referred to in this specification is predicated upon the average of the specific gravity of the involved mixture.

As the mass size or diameter of different materials varies, this in turn also alters the referred to average specific gravity, and accordingly appropriate adjustments may again be required in the r.p.m. of the rotating elements to additionally account for this factor.

The limitations regarding or control of r.p.m. are primarily based upon the mechanical efficiency of the rotating parts, such as shafts and bearings, and the resultant force imposed upon them by centrifugal force. Everything else being equal, however, the general rule is that the higher the speed of the rotating shaft, et cetera, the involved frictional forces will increase almost as the square of such increase in speed. This results in a corresponding increase in horsepower and current consumption and in corresponding wear of the various components.

At any rate, an increase in speed beyond the formulized limits expressed herein does not materially benefit the mixing operation and so, therefore, it is desirable that the elements operate at the lowest possible speed consistent with intensive mixing, ricoheting and spatulation.

Critical speed may be defined as the lowest r.p.m. necessary to centrifuge an infinitely small particle at the outer extremity of the paddle or blade. By appropriate equation, this speed may be computed as follows:

$$CS = \frac{76.63}{\sqrt{D}}$$

The formula has been derived over the years as it has usually been applied to ball mills. CS is critical speed and D represents the tip diameter of the paddles in feet, i.e., linear distance from tip to tip.

This formula applies to a material having an average specific gravity of 3. With, for example, a specific gravity of 5, the r.p.m. is decreased in the linear proportion of 3:5. With coal, which has a specific gravity of about 1.5, the speed is double. And if the specific gravity is increased to 6, for example, the speed is cut in half. Thus the speed is inversely proportional to the specific gravity of the material treated and with regard to the median of 3.

As a further application of this principle, iron ore has a specific gravity of about 4.5 with a corresponding 33⅓ % decrease in speed for such ore.

One other factor is involved: One must take into account the thickness of the material at the tip of the paddle or agitating element, and that thickness accounted for in the formula.

Thus, if the layer of the material in question is about 4 inches, that is, 4 inches in excess of the tip diameter, the critical speed would be computed as follows:

$$CS = \frac{76.63}{\sqrt{D - \frac{8}{12}}} \text{ (to convert to feet)}$$

We are thus here dealing with the minimum working diameter in order to obtain proper centrifuge of the material under consideration and to consequently obtain formulation of seed nuclei so as to agglomerate the product in accordance with the invention.

As another example, suppose a 24 inch diameter paddle is provided with 2 inches of material thereon, then the critical speed formula may be represented as follows:

$$CS=\frac{76.63}{\sqrt{D-4}}$$
$$=\frac{76.63}{\sqrt{\frac{20}{12}}}=\frac{76.63}{\sqrt{1.66}}$$
$$=\frac{76.63}{1.3}=59 \text{ r.p.m.}$$

The high speed of the twin shafts provides a shattering, shearing action as compared to the kneading effect of conventional pugmill and other known types of mullers. Also, as compared to conventional mixers, in the operation of the instant device, the material is maintained in suspension with about 50% voids, and without a fixed bed of material as is commonly the case with mixers of conventional design. Wear is thus reduced to a minimum. The material being pelleted builds up slightly on the leading edges and surfaces of the paddles so that other than the extreme tips of the paddles, the wear is actually material on material. Thus tip wear is very slight.

In the preferred unit of the invention, the over-all length of the blender is about 10 feet. In this version of the unit, each shaft supports one hundred twenty paddles with the pitch of the blades thereon set at no greater angle than 15°. The number of paddles is, however, dependent on the relative size of the unit, as well as the particular type of material being handled.

A more complete description of this blending apparatus is found in my said Patent No. 3,337,146.

At any rate by the high speed of the paddles, resulting in centrifuging and placing into aerated suspension the materials being blended, the materials being blended actually function as liquids. For example, with all of the paddles at a zero angularity, material fed into the input end will go into an aerated suspension and flow through the blender in the same manner as water. If the blender is tilted slightly downward at the discharge end, all of the material will flow out of the blender, and this even with paddles at a slight negative angle. The degree of tilt will be a function of the angularity of the paddles. Conversely, if the paddles are set at zero angularity and the discharge end is elevated it is not possible to empty the blender beyond a relative volume, represented by a horizontal line from the discharge point of the blender which would strike the input end somewhere above the bottom of the blender.

The involved angularity achieves regulation of propulsion of the treated material through the blender at some predetermined speed. The non-angled blades have no propulsive effect upon the material but additionally obtain the desired shearing and mixing type of agitation that is visualized as necessary to achieve the desired functions of the invention as herein set forth.

The tips of the blades are serrated to provide additional shearing and shredding action and also prevent the material being processed from adhering to the sides of the unit and also prevent the same from agglomerating into large and undesirable globules. The blender is usually set so that complete blending has occurred in the first 80° of its length. At this point the collisions of particles become complementary rather than violent and small seed pellets, nuclei or granules are formed. Where granulation is not desired, i.e., in handling such material as foundry sands, the pitch of the paddles is increased, or the blender set on a slight positive angle, or shortened to provide a light, fluffy completely mixed product. The high speed and mixing action of the unit causes the material to move as an aerated column, in contrast to the usual rolling, kneading action of a paddle of a pugmill or other type of prior art mechanism. In fact, experimentation has demonstrated that on a time basis, one pass of the material through this unit is, as it is here disclosed, equal to upwards of 60 minutes in conventional types of mixers.

The operation of the blender should be apparent from the foregoing description thereof; the involved material, properly proportioned and of a proper liquid content, is continuously fed into one end of the unit. Such material strikes the relatively flat pitch of the paddles. The speed and trajectory of the material is a function of the rate of feed to the blender as well as the mass and density of the individual clumps and until the total mass becomes homogeneous a relatively large number of violent collisions occurs, accompanied by a ricocheting effect against the paddles. The material will build up on the paddles until an efficient air flow shaped section is developed. Then the build up will stabilize. Since the paddles are operating at a slightly greater speed than the critical speed of the material and since the paddles intermesh, a massive build up on the paddles or shaft, creating an uneven balance, is not possible. As the material progresses through the blender, the material becomes more and more homogeneous.

In most operations, pre-granulation, pre-nucleation or seed pelleting is desirable, and the present equipment effectively accomplishes this. Also, it enables size control over these granules or miniature pellets within ranges of from about mesh sizes to about ⅜ of an inch.

When it is desirable to agglomerate coarse and finely divided material such as minus ¾ inch, ore fines with other finely divided materials such as dust, limestone, and coke, such as preparatory to producing sinter for blast furnaces, the action of the blender is such that the larger particles will become coated with the fine material and the resulting product of the blender will be particles about 25% larger than the largest particle in the mix and smaller, also there will be no free dust discharged from the blender. Some liquid medium, such as water, is required to achieve this result.

Where it is desired, rubber and other thermoplastic materials can be used by bringing the temperature of the materials to the softening point (or liquid phase) of such materials. For example, the blender described herein has produced raw rubber compounds in granule form, ready for molding, in place of the conventionally used Banbury mixer or two roll mill.

The effect of the blending operation is the creation of considerable strength in the resultant pelleted product. Assuming a conventional iron ore mix consisting of, e.g., 100 parts iron ore, 2½ parts limestone, ½ part bentonite, processed in accordance with the instant invention where seed pellets produced by the blender are later ball milled and then adequately dried, the dry ball crush strength, in a run of 50 tons per hour, has been demonstrated to be about 250 pounds, reference here being made to the size of blender under consideration in this example, about 10 feet in length with two hundred forty intermeshing or overlapping paddles.

In the several processes contemplated by this invention, it is essential that a proper drying stage utilized to achieve, e.g., a pelleted product which is uniform, of even density throughout, hard and, of controlling significance—one that has been evenly dried throughout the mass from center to surface. To this end use has been made of a drying technique, and a means for carrying same out, which centers about the novel concept of proper control over the drying medium, such eliminating possibility of inadvertent pellet discharge as well as the most important aspect—achieving the required degree of evenness of drying.

Although there are known drying processes involving distribution of the involved material over a perforated belt through which the drying medium is dispersed, the problem in such prior art procedures has been one of proper control of the drying medium, i.e., the disadvantage has been that unless the charge of material to such a drying mechanism be dispersed or distributed in an exactly even and uniform manner, drying will be uneven throughout the bed of material. For example, where such a belt is not fully and evenly laden, with portions of contrasting greater and lesser material depth, the drying medium will pass through the unloaded portion of the conveyor, thereby not fully drying or conditioning the remainder of the material. In commercial operations, it is practically impossible to uniformly load such a conveyor over an extensive period of time in such manner that the charged material throughout the entire extent thereof is of uniform depth. Hence in such instances, the locations of full load may sometimes achieve adequate drying or perhaps under-drying, while the portions of the conveyor which are relatively unloaded receive a maximum of the drying medium. Therefore, the heavily loaded as well as comparatively unloaded portions of the belt are not brought to a uniform condition.

The problem has been solved by the instant invention. Here such a woven or open mesh type of belt (in reference to the knitted type) is passed over a perforated plate having a fixed percentage of open area. Such degree of open area is a function to be determined or controlled by the degree of openness of the material being treated. If this degree of openness of the perforated plate be predetermined, as it can be particularly with respect to the pelleting art, it has been found that the degree of drying will be a relative constant irrespective of the thickness of the bed at any particular portion of the conveyor belt. In most instances, it has been found that for the ordinary volumes of drying medium that are usually employed a 10% open area in such perforated plate or access area is consistent with the percentage of open area in the material being processed which may more usually run about 30%. Although this degree of material permeability will vary from material to material the inherent principle remains the same: that the degree of openness of the material can be determined; and that a given lesser degree or optimum degree of openness in the access area can then be determined.

For example: the degree of openness of the carrier or tray, i.e., the perforated plate over which the conveyor belt is driven, or the number of perforations in same for the admission of dry air, must be no more than the minimum permeability of the bed of pellets if thorough, even drying is to occur. Thus, if it be assumed that the mass or bed of pellets has 20% minimum permeability, and if also it be assumed that the perforated plate over which the conveyor rides has a maximum permeability of 10%, then the plate will have a greater resistance to air flow than the pellets. The result is that so long as the bed of pellets exhibits this greater permeability (20%) there will be even air flow throughout the entire length of the conveyor with even drying of the bed resulting. Consequently, the velocity of air is sufficiently low to prevent floating or relative and perhaps damaging motion of the pellets during the conveying, drying operation. Hence the basic concept of this facet of the invention lies in the discovery that the open area over which the material is being processed can be adjusted to accommodate the particular type of material being processed, thereby overcoming the problem of lack of uniformity of drying should the belt at any portions thereof be either lightly or heavily laden.

Referring to FIGURES 2 and 3, the preferred embodiment of the invention involves the use of an elongated plenum chamber of some 250 foot length. The same is represented by the enclosure generally designated at 80. The latter comprises the usual base structure 82, a series of side supports 84 and 85 positioned to slopingly support the drying oven and a top 90 surmounting an intermediate cantilever truss arrangement 88 as shown in FIGURE 9. Appropriate spaces near the roof 90 permit air passing through the bed of material to be discharged to the atmosphere. The chamber itself comprises opposed side walls 91 and 92 rising upwardly from the base 93. These side walls are surmounted by a plate 95 which is perforated, as at 98, to permit air flow therethrough for drying purposes. Elements 91, 92, 93 and 95 are rendered relatively air tight at their respective engaging edges, so that the plenum chamber, except for perforations 98, is air tight throughout. A wire belt 100 of the woven type extends the entire length of the housing 80. This is journaled for continuous movement upon the usual type of rotating drums or rollers 110 and 118. The charge of pellets indicated at P in FIGURES 9 and 10 rides upon this conveyor belt 100, with the drying medium being forced through perforations 98, through the belt 100 and the charge of pellets placed thereon, and is finally exhausted to the atmosphere through the spaces provided therefor near the roof 90.

The chamber is angled to the horizontal as indicated in FIGURE 8 with the lower roller 110 mounted upon a suitable base 112. At the opposite and upper end of the chamber, the other roller support 118, suitably journaled in an appropriate journal 119 as indicated in FIGURE 7, is disposed immediately above a discharge hopper 120 to which the charge is delivered after completion of drying. The hopper is of course supported in any suitable manner as by the framework 125.

Air at elevated temperature is admitted into the plenum chamber 80 by means of a hot air chute 130 receiving the drying medium from a suitable source of supply and provided with two branch lines 132 and 134. The latter directly supply the drying media to the plenum near the lower roller and also intermediate both ends of the referred to plenum. Such drying medium is thus kept at an even and constant pressure throughout the entire plenum chamber 80, being discharged through perforated plate 98, open mesh belt 100 and the product P in the manner indicated. After discharge through the mass of pelleted material the air proceeds to the atmosphere through openings referred to located near the roof portion 90 of the housing 80. Such air flow is indicated by the arrows found in FIGURE 4.

In the preferred embodiment of the invention, it has been found that the range of air temperature for most drying purposes is preferably from 225° to 350°. Considering the appreciable length of the 250 foot drying oven as herein described, it is important that the air pressure be even and constant throughout. This is accomplished in part by discharge of drying medium, obtained through a suitable source, through the two spaced passageways 132 and 134 in the manner indicated. Such drying medium is thus distributed throughout the entire length of the plenum and passed at a constant pressure throughout, through the open mesh belt 100, the pelleted material and ultimately discharged to the atmosphere. A suitable drying medium pressure can be determined from the following base point: it has been found that the pressure of same should be .5 inch water gauge per inch of material charged to the conveyor belt. Also, the velocity of air flow, taking into consideration the foregoing factor, should be low enough to prevent floating or relative motion of the pellets. The speed through the drying oven, measured on a time basis, may vary from some fifteen minutes to two hours; however, the rapidity with which drying is achieved is largely dependent upon the type of material being treated, and hence a variable factor.

As seen in FIGURES 2 and 3, the pellets are received directly from the balling drum 114 and discharged to the belt 100 by means of the rocker-feeder mechanism 115 hereinbefore referred to. The latter evenly distributes the charge throughout the entire width of the belt.

From the conveyor 100 the dried pellets are discharged, as indicated, into a bin 120 preferably of 20 ton capacity, for later disposition. Such bin is supported by any usual type of frame structure 125.

Again, in the embodiment of the invention herein described, it is preferred that the conveyor belt, of woven type, be made of stainless steel wire having a 2 mesh opening perpendicular to the flow of the belt and an 8 mesh opening parallel to the flow. The referred to steel plate is preferably provided with ⅜ inch round hole openings for two-thirds the distance from the feed end of the oven and 5/16 inch round hold openings in the last third of the 250 foot distance. Such holes in the plate are preferably spaced on 1 1/16 inch centers. The return run of the belt is achieved through the use of suitable rollers (not shown) underneath the plenum chamber. The size of the holes will be generally related to the size of the pellets or extrusions being dried and to a lesser degree as to the mean depth of pellets on the belt; with pellets of 60 mesh the holes should be small and spaced close together to minimize or eliminate floating the pellets which would cause relative motion between the pellets and cause degradation.

The foregoing dimensions with respect to the openness of the perforated plate lie within the contemplation of the above explanation: an assumed 20% open area or permeability in the charge of material to the conveyor, then a 10% open area, calculated on that basis, in the perforated plate. Hence in operation and even assuming the pellet charge to the belt to be non-uniform, uneven and more or less at random, complete drying will necessarily follow for the over-all permeability of the belt is substantially restricted as compared to the over-all permeability of the charge placed on the conveyor.

As indicated in the foregoing, it has been determined that the degree of openness or permeability of the perforate plate should be no more than the permeability of the mass resting upon the belt for drying purposes. In the art with which the invention is primarily concerned namely, pelletizing, it has further been found that the maximum air passage area in the perforate plate should not exceed 35%. More generally, the permeability as applied to such materials will vary somewhere between 10% to 20%. The drying medium, if under an air pressure of about .5 water gauge per inch of pellets, will provide a velocity of air through the conveyor sufficient for drying (assuming a 10% permeability of the plate) but sufficiently restricted to prevent "floating" or relative motion of the pellets and resultant damage to or loss thereof. It has been found that a bed of material comprising pellet depths of up to 48 inches can be adequately and uniformly dried by the use of the instant apparatus. Moisture removal in the amount of from 2% to 4% moisture retention in the ultimate product is easily obtainable.

It must be understood that the invention is not only directed to novel procedures for the processing of various materials, and particularly the pelletizing of same, but depends in large part upon the novel arrangement of the apparatus here involved insofar as the same is inclusive of the described blender and drying oven.

In any event, the following examples are illustrative of ramifications and variations falling in the scope of the invention.

Example I.—Slurry pelletizing

This method of treatment approximates that set forth, supra, with regard to a useful procedure enabling recovery of coal plant waste slurry containing coal fines.

It was determined that 50% of the particles in the slurry were smaller than 325 mesh size. The clean coal was separated from the refuse in three froth flotation units utilizing methyl isobutyl carbinol, as a suitable frothing reagent, pumped into the feed slurry to such cells at the rate of about 10 gallons per hour, this being equivalent to approximately .042 gallon per ton solids in the feed.

The slurry processed was obtained as over-flow from settling tanks handling clean coal from concentrating tables. It contained 5% solids.

Each of the three froth flotation units contained four cells with a total air input of 600 c.f.m.

From such froth processing the cleaned coal slurry was pumped to an 8 disk filter. The discharged filter cake contained about 26% moisture and was discharged into a conveyor which in turn fed the filter cake into a blender having the characteristics of that described in the foregoing.

In the instant case, a binder was charged into the blender as indicated in FIGURE 1. The binder here constituted lignin, pumped into the blender at the rate of 0.6 gallon per minute. The blender was permitted to operate at a high rate of speed until micro or seed pelleting was observed at which time the material in the blender was continuously fed into a steel balling drug, which is normally rotated at from 18 to 36 r.p.m., and in the instant example, at about 25 r.p.m. Such drum, as hereinbefore referred to, may be varied in angularity to the horizontal from 0° to 5°, but in the instant example was set at 2° to the horizontal.

As the blended material progressed through the drum, it balled into pellets ranging from ¼ to ¾ inch in diameter.

The pellets were discharged from the drum to the rocker-feeder hereinbefore described and thence to the surface of the open mesh conveyor belt, as also hereinbefore described.

The conveyor carried the pellets at the rate of about 12 feet per minute through the 250 foot length of the described drying oven, such oven having a slope of about 10° to the horizontal.

The dimensions and characteristics of the drying belt as well as the specific dimensions and spacing of the openings or perforations in the perforated plate, were the same as those specifically set forth above.

From the conveyor, in this example, the now dried pellets were then discharged directly to a conveyor used for loading slack coal into railroad cars.

Examination of the pellets reveal that they varied in size from about ¼ to ¾ inch, were uniformly dried throughout, exhibited a hardness characteristic of the type hereinbefore referred to. The pellets contained about 4.5% ash, 0.94% sulfur and less than 3% moisture. The pelleted product represented recovered coal of a usable, marketable size and adaptable for use in many industrial processes.

Example II.—Mineral ore agglomerating and pelleting

The processes of the invention are especially useful for the preparation of ores prior to high temperature fusion. This is particularly true with respect to the preparation, by way of pelleting, of iron ore, and represented by the optional procedure indicated in FIGURE 1.

It is desirable that certain binders be used, incorporated in the fine ore mix prior to admission to the blender. Such materials as starch, i.e., corn starch, or lignin sulfonate are especially useful as binders. The starch may be incorporated in an amount of 1% to 2% and the sulfonate in an amount of .2% to .5% (both percentages by weight). It may also be desirable to incorporate, as a coating to the completed pelleted product, pitch or asphalt in an amount of about .5% by weight.

In the instant example, the ore is finely ground to a size of about 100 mesh. It is then mixed with additional components, as limestone and bentonite, in the following proportions: 100 parts iron ore, 2½ parts limestone, ½ part bentonite. To this is added 2 parts of lignin sulfonate liquor of 50% concentration.

The resultant slurry is passed to the blender where the mixture is violently agitated for a period of time sufficient to form micro or seed pellets at which time, through the apparatus as described above, the blended material is fed to a balling drum where agglomeration of the seed pellets occurs, resulting in the creation of balls or pellets averaging from ½ inch to ¾ inch in size.

These pellets are then passed through the drying oven in quantities and at the speeds outlined in the foregoing whereby the pellets become thoroughly dried.

After drying the pellets are passed through a rotating drum (as indicated in FIGURE 1) for coating purposes where they are coated with asphalt, such asphalt being added at this phase in the amount of .5% by weight of the product passing through the coating drum.

The resultant pellet is one of high strength and suitable for reduction or refining at temperatures of the order of 2400° F. The same will satisfactorily go through the fusing phase at such temperatures and remain as a strong discrete pellet.

Example III.—Pelleted carbonaceous material for foundry purposes

In this example a material is prepared which is useful in foundry practices. In the latter respect, it is recognized that if properly prepared, the carbonaceous material of this invention obtains a better surface cast. This is because when the hot metal strikes such material, incorporated in the sand mold, which converts the volatile portion thereof into a gas film it protects the metal from the sand.

In this example, coal fines may be used as the starting material. These are of extremely small size, generally less than 325 mesh.

Such fines, if not already in a water solution, are mixed with water to the extent that the consequent solution represents about 20% solid material and about 80% liquid.

The resultant slurry is fed to the froth cells as hereinbefore described wherein through froth flotation in the described manner the bubbles formed in the flotation procedure attach themselves to the carbonaceous material but not to the non-carbonaceous, as rock, bony, et cetera. The result is that when discharged from the froth flotation cells, the thickened slurry is far purer insofar as carbonaceous content, with a limited amount of ash forming constituents.

The slurry is then passed to a filter where the moisture content is reduced to about 35%, at which point the slurry is fed into a blender as hereinbefore described.

At the point of admission to the blender, a binder in the form of lignin sulfonate is added in an amount of about 2% by weight. The solid-liquid mixture is treated in the blender until nuclei or small granules are formed forming the basis of the final pellet. Pelleting is obtained by passing the material from the blender into a balling drum of the type described above. The resultant pellets in this instance are larger than 325 mesh and range from 28 to 200 mesh in size.

The resultant pellets are then dried in an oven drier of the nature herein described by which procedure moisture content is reduced to about 2%.

The resultant pelleted product, of a mesh size of from about 28 to 200 mesh is suitable for use in foundry practice as a constituent of the sand commonly used in casting. The particle size is such that the pellets readily intermingle with the sand, are of comparable size, and upon pouring of the mold release a gaseous envelope or film between cast and mold, such that the surface of the cast is smoother, more uniform. The uniform size of distribution assures uniform gas release around the periphery of the casting, resulting in reducing the cost of cleaning and subsequent machining of the casting. The uniform and comparable size of the pellets also achieves a more effective and uniform gas film for the purposes herein described.

*Example IV.—Agglomerated feed for metal casting processes*

In the industrial use of castings and metals a large amount of finely divided metallic scraps are accumulated. Usually the latter take the form of chips, dust, borings, et cetera. The latter are of a relatively fine size, generally less than ¾ inch size, as compared to the coarser feed wherein heavy scrap metals are utilized in the open hearth type of furnace. Although the heavier pieces of metal can be melted and processed by conventional methods without any appreciable metal loss, difficulty is encountered with respect to the more finely divided metals, whether the latter be brass, aluminum, cast iron, or other material. When metal fines of the order here contemplated are sought to be processed by furnace treatment, a substantial amount of the same are either oxidized, rendering the same useless, or actually lost by being discharged through the stack of the furnace.

In the instant example, the process is considered in the light of producing a suitable charge for a cupola furnace. In the operation of the latter a large amount of air, at considerable velocity, is passed through or over the charge in order to provide the required temperature for melting purposes. Hence, small fines or small pieces of metal placed in such a cupola will either be completely oxidized or blown out of the furnace with the exhaust fumes. The current practice of the industry is to briquette such small fines by means of hydraulic pressure, the result being a regular shaped form, usually in some form of a mold or die. Such procedures are expensive, and the resulting strengths of such briquettes are minimal.

In the practice of the instant process, these small pieces of material, or scraps, are further reduced in size by an applicable procedure, as hammer milling, or similar conventional methods. When reduced to a size of about ¼ inch or less, such fines are admixed with water to create a liquid slurry having a solid to water mixture of about 25% to 75%.

In order to provide sufficient fines to fill the voids, powdered coke or powdered limestone may be added. In any event, it is preferred that a cereal type binder be used in such slurry in an amount from about 1% to 5% cereal, and an additional binder, comprising lignin sulfonate be added in an amount of from about .5% to 2%, the additions of such binders representing percentages by weight.

Such a slurry or metal-liquid mixture is then passed to the blender of the instant invention. The blender is operated at a sufficiently high rate of speed to create formation of nuclei or seed pellets at wich time the material is continuously discharged from the blender to a balling drum, operating at about 25 r.p.m. The seed pellets heretofore formed are caused to agglomerate in such balling drum resulting in the formation of pellets having an average size of from about ½ inch to ¾ inch in diameter.

The pellets so formed, through the rocker-feeder mechanism hereinbefore described, are charged in an even and uniform manner to the conveying belt of the drying oven. Temperature in the oven is maintained at about 350° F., with the result that the individual pellets are substantially dried to an extent of about 4% moisture retention.

The resultant pellets may be subsequently coated with pitch or asphalt, but in any event, when dried, exhibit the required hardness constituents for charging to the furnace. Being of the size heretofore stated, such are sufficiently large to accomplish the melting down thereof in the furnace without substantial oxidation, and because of such relative size without undesirable discharge thereof through the furnace stack. Hence the pelleting procedure enables recovery of metal heretofore lost or wasted. Also the pellets represent a lower cost raw material, for the process contemplates salvage of finely divided materials which are otherwise unsuitable as a furnace feed.

*Example V.—Improved form of seacoal*

In the production of castings, it is desirable to prevent the sand forming the mold and the coal from coming into immediate contact with the metal as it is poured and while it is in the liquid phase. In conventional practice it is therefore common to utilize a powdered coal mixed with the sand. The volatile matter in such coal, which is usually bituminous coal, upon contact with the hot metal readily volatilizes or turns into a gas and the latter provides a barrier between the metal and the sand. Since bituminous coal will volatilize for a period of time at temperatures from about 400° F. upward, the coal continues to provide this protective gas film until such time as the metal becomes solid at the interface, usually when a temperature of about 2000° F. is reached. Other materials are also used for this same purpose: corn flour is conventionally utilized in the steel industry whereas powdered coal, and quite frequently the form of powdered coal known as seacoal, is employed in the iron industry.

According to known procedures, seacoal is prepared for such processes by grinding to the desired size to enable proper distribution in the sand and consequent adequate gas release. However, often times the grinding operation results in a material which is too fine. The result is that volatization occurs too rapidly with insufficient gas generation at lower temperatures to keep the metal from contact with the sand. As there is a definite relationship between such particle size of the coal and the size of the sand being used, it is therefore desirable in most instances to have a minimum amount of minus 200 mesh material in the ground seacoal.

The instant process contemplates a method of production of pelleted seacoal which will be uniform as to size and meet the aforesaid requirement of being larger than 200 mesh size; in other words, the pelleted product will average from between 28 to 200 mesh and this size is ideal for foundry practice, i.e., as material which uniformly volatilizes at the proper temperature and rate for creation of a uniform, protective gas film.

In the instant process, the seacoal is crushed to a 28 mesh size, it being appreciated that such crushing procedure will produce innumerable fines of substantially smaller size. It is then mixed with water in sufficient amount to produce a solid content of about 10%. This slurry is charged to a froth flotation cell a suitable reagent being added, as pine oil and kerosene, in relatively small amounts, i.e., from 1% to 5% thereof. In such froth flotation cell, as heretofore described, such additives facilitate the formation of bubbles which attach themselves to the carbon particles but not to the non-carbon particles. The bubbles rise to the surface, are scraped off, and are thereby separated from the material containing the higher amount of dirt or other impurities.

The material is then passed to a vacuum filter (see FIGURE 1) where a part of the moisture is removed so that the resultant moisture retention is in the range of from 20% to 40%.

This slurry of reduced moisture content is then intermixed with a binder such as lignin sulfonate, the latter being added in percentage by weight in amounts of from .25% to 1.0%.

The coal-binder slurry is then injected into the blender which first disperses the lignin, water and coal, then causes small agglomerates or seed pellets to be formed so that by proper control of the resident time in the blender and control of the pitch of the blades thereof, a product having only a trace of minus 200 mesh is ultimately produced.

From the blender these nuclei or seed pellets are discharged into the drying oven, as above described, where they are carried through at the rate hereinbefore mentioned during which time they are subjected to a temperature of about 350° F. The moisture content is thereby reduced from 2% to 4%.

The pellets so formed will have an average size of between 28 mesh and 200 mesh, all of such sized particles being ideal for incorporation in a given sand mixture. Since the pellets are substantially coarser than would be found in the ordinary fines resulting from mere crushing of such carbonaceous material as seacoal and also are of more uniform size, the rate of volatilization thereof is more uniform. The result, in any casting procedure, is to obtain a more uniform gas envelope protecting the interface, with a more perfect mold being produced.

There is an additional significant factor involved in the foregoing process: the same obtains, due to the combination of steps hereinbefore set forth, a pelleted seacoal product exhibiting a minimum amount of free ash, i.e., less than 1% thereof. Where seacoal is conventionally ground for casting procedures, it will typically contain from 2% to 5% free ash. A 1% or less content thereof is critical in this sense—presence in an amount appreciably exceeding 1%, e.g. from 2% to 5%, permits such ash to react as a fluxing agent. Such ash is primarily a silicate and when present in an amount exceeding about 1% these discrete particles thereof react as a fluxing reagent.

In the production of the instant pelleted product, it was found that the some contained free ash in an amount of from about .9% to 1.1%, which represents a significant and critical difference, for in this instance the pellet is completely non-fluxing. Consequently a better case surface is obtainable by use of the instant pelleted product.

The process of the invention is adaptable for the recovery of other waste material such as valuable metals which are otherwise lost in the fumes of open hearth furnaces. In the operation of this type of furnace, particularly in the melting of steel, a relatively large amount, sometimes as high as 8 tons per heat of metal, of iron oxide is picked up from the charge and carried out the stack. Not only is an objectionable nuisance thus created, but such materials are wasted and unused. There are known practices for collecting such materials and preventing the discharge thereof to the atmosphere. In most instances, the ferrous oxide which is fed to an open hearth contains relatively high percentages of zinc, lead and other similar low boiling point metals. These materials are not desirable in a blast furnace, often resulting in deterioration of the refractory furnace lining. However, in an open hearth furnace, such material is not objectionable for the reason that some zinc and lead will be entrapped in the slag and in other areas the same will not condense out as would be the case in the operation of a blast furnace. This is simply because the flue temperatures of an open hearth are much higher than those used in a blast furnace.

By use of the instant procedures, such open hearth fumes can be collected and agglomerated in such fashion as to permit them to be used as charges to the open hearth. Although agglomeration of finely divided materials for blast furnace purposes is known, in an open hearth the chemical requirements are such that a certain amount of iron oxide is required in order to reduce the carbon present in the pig iron charged to the open hearth. Such iron oxide must be relatively large in size in order to prevent discharge consequent upon the high speed of the combustion of an open hearth. Therefore, it is contemplated that the minimum size iron oxide for an open hearth should be at least 1 inch diameter size.

In the use of the instant invention, the open hearth fumes (contining oxide particles) may be collected, dry or wet, and fed to the blender, as it is herein described. Certain organic binders of the cereal grain or sugar type are added in relatively small amounts—from .5% to 5% of cereal type binder and .2% to 1% of, e.g., lignin sulfonate. Such binders are thoroughly dispersed with the discharge fumes from the furnace in the blender and the latter will discharge a pregranulated material. From the blender the small seed pellets produced thereby are fed to a balling mill resulting in agglomeration thereof to the aforesaid size—about 1 inch diameter. The resulting balls or pellets may then be fed to the drying oven, resulting in removal of moisture down to at least .5% moisture retention.

The pellets so produced are thus dried to the point where the binders become effective in producing a crush strength adequate to meet the requirements of the open hearth. Where desired, the pellets can be coated with a pitch or asphalt type of material after drying, or in the case of asphalt, an emulsified asphalt can be applied prior to drying. The amount of surface coating is preferably in the order of .1% by weight. This greatly improves the abrasion resistance of the resulting pellet, and of course, renders them highly water resistant. Another variation uses an extrusion screw in place of the balling mill wherein the pregranulated material is fed into a conventional extrusion device which produces a continuous stream of uniformly dense and uniform cross section material. The stream is cut by a suitable device so the resulting material might be a solid 2 inches diameter by 2 inches long. These solids usually referred to as slugs are then distributed onto the drying belt and dried in the manner previously described. This alternate has the advantage of providing very uniform sizes and permits agglomerating materials and combinations of materials that do not readily convert into pellets.

In another example where very small pellets or granules are required or where relatively coarse material is to be agglomerated with fines the product of the blender without subsequent increase in size is deposited on the drying belt and dried.

Other mixtures for charge purposes can include blower dust from blast furnaces, dust collected from checkers and stacks of the open hearth itself, magnetically separated slag fines, et cetera. In any event, another primary concept of this invention is the utilization of open hearth fumes by transforming the solid content thereof to a form suitable for use in the open hearth.

Mention has been made in the foregoing of the pelleting of seacoal for use in casting procedures. In addition, the invention contemplates the pelletizing of any other type of coal fines. Whether bituminous or anthracite, the pelleting process requires that the coal-liquid mixture be initially reduced from a 10% solids content to 20% to 40% moisture retention by means of a vacuum filter or similar type of drying device. Any such process results in a mass of coal having a wide variation in moisture content, i.e., a given quantity of coal fresh from a vacuum filter, in a given cubic centimeter, may have as little as 15% moisture and a few inches away, in the same batch, a like quantity may have as much as 50% moisture. However, by taking a filter cake of this semi-dried material and passing it through the high speed mixer or blender of the invention, this moisture is redistributed. The more uniform the moisture distribution the more uniform the size of the product formed in the balling mill. When a relatively low percentage of binder is added, as .5% by weight, the carbonaceous seed pellets formed in the blender are readily balled, and when passed to the drying oven, are dried by the capillary movement of the moisture from inside the pellet to the surface thereof. Hence the invention includs the concept of drying coal fines by the agglomeration of the finely divided coal into larger particles of proper density, hardness and limited moisture content of from about 4% to 6%. The process described herein does not require use of temperatures in excess of 300° F. and therefore, as compared to other methods, does not deteriorate the coking properties of such pelleted coal.

In other areas of industry, a finely divided material, chemically inert, is useful. Typical examples are the use of such materials as binders in rubber compounds, plastics, printing inks and paint. In the instant procedures, finely divided coal, either the fines from ordinary mining operations or larger size coal which has been properly pulverized, can be so treated as to create a product useful as a binder in the fields just mentioned. Such is accomplished through the froth flotation, blending and unique drying combination of steps of the instant process.

Obviously, many modifications and equivalents of the invention hereinbefore set forth may be made without departing from the spirit and scope thereof, and therefore only such limitations should be imposed as are indicated in the following claims.

I claim:

1. A process for the even drying of a bed of preformed pellets of solid fine material, said bed of pellets being of varying thickness throughout, comprising passing said bed of pellets through an air drying zone, establishing a relatively even bed of pellets having an air permeability of no less than about 20%, wherein said air permeability represents a 20% open area for passage of air therethrough, said drying zone including a permeable support area for supporting said bed of pellets, selecting a support area having a permeability substantially less than the permeability of said bed and a consequently greater resistance to air flow than said bed, the permeability of said support area representing the open area in said support area for air passage therethrough, and passing drying air upwardly through said permeable support area, whereby air flow through said zone and said bed is sufficiently low to prevent bed disturbance and creation of blow holes therein, thereby assuring even drying throughout said bed of pellets irrespective of said variance in thickness of the bed throughout said support area.

2. The process as defined in claim 1 wherein the permeability of said bed is from 20% to 35%, and the permeability of said permeable support area is about 10%.

3. The process as defined in claim 2 wherein said drying air passed upwardly through said permeable support area is maintained at a temperature of from 225° F. to 350° F.

4. the process as defined in claim 2 wherein said drying air is maintained at a pressure of .5 inch water gauge per inch of thickness of said bed of pellets upon said support area.

References Cited

UNITED STATES PATENTS

| | | |
|---|---|---|
| 2,513,369 | 7/1950 | Shaw |
| 3,068,764 | 4/1963 | Beck _____ 263—8 |

JOHN J. CAMBY, *Primary Examiner.*